(12) United States Patent
Kim et al.

(10) Patent No.: US 10,771,002 B2
(45) Date of Patent: *Sep. 8, 2020

(54) DEVICE FOR STABILIZING DIRECT CURRENT (DC) DISTRIBUTION SYSTEM

(71) Applicant: LG Electronics Inc., Seoul (KR)

(72) Inventors: Seongju Kim, Seoul (KR); Mun Seok Seo, Seoul (KR); Joonsik An, Seoul (KR)

(73) Assignee: LG ELECTRONICS INC., Seoul (KR)

(*) Notice: Subject to any disclaimer, the term of this patent is extended or adjusted under 35 U.S.C. 154(b) by 69 days.

This patent is subject to a terminal disclaimer.

(21) Appl. No.: 16/124,327

(22) Filed: Sep. 7, 2018

(65) Prior Publication Data

US 2019/0081586 A1 Mar. 14, 2019

(30) Foreign Application Priority Data

Sep. 8, 2017 (KR) .................. 10-2017-0115226

(51) Int. Cl.
| | | |
|---|---|---|
| *H02P 23/26* | (2016.01) | |
| *H02P 27/08* | (2006.01) | |
| *H02M 1/14* | (2006.01) | |
| *H02M 1/08* | (2006.01) | |
| *F04B 35/04* | (2006.01) | |
| *H02M 1/088* | (2006.01) | |
| *H02M 7/5387* | (2007.01) | |
| *H02M 1/00* | (2006.01) | |

(52) U.S. Cl.
CPC .............. *H02P 27/08* (2013.01); *F04B 35/04* (2013.01); *H02M 1/083* (2013.01); *H02M 1/088* (2013.01); *H02M 1/143* (2013.01); *H02M 7/53871* (2013.01); *H02M 2001/0058* (2013.01)

(58) Field of Classification Search
CPC ...... H02M 1/083; H02M 1/088; H02M 1/143; H02M 2001/0058; H02M 7/53871; H02P 27/08

See application file for complete search history.

(56) References Cited

U.S. PATENT DOCUMENTS

2012/0126741 A1* 5/2012 El-Refaie .............. H02P 27/08
318/812

FOREIGN PATENT DOCUMENTS

JP 2014-138477 7/2014

OTHER PUBLICATIONS

Kwak et al., "Performance Analysis of High Efficiency DC-DC Chopper added in Electric Isolation", *The Korean Institute of Power Electronics*, 2007, 115-117.

* cited by examiner

*Primary Examiner* — Muhammad S Islam
(74) *Attorney, Agent, or Firm* — Finnegan, Henderson, Farabow, Garrett & Dunner LLP

(57) ABSTRACT

A device for stabilizing a direct current (DC) distribution system includes a capacitor unit charged by a DC voltage supplied by a power supply stage of the distribution system. The device further includes an inverter that has three pair of switching elements. The device also includes a voltage stabilization circuit constructed using one pair out of the three pairs of switching elements in the inverter. The device also includes a controller that controls the voltage stabilization circuit to alleviate instability of a DC voltage generated in a transient period.

20 Claims, 15 Drawing Sheets

DEVICE FOR STABILIZING DIRECT CURRENT (DC) DISTRIBUTION SYSTEM

CROSS REFERENCE TO RELATED APPLICATION

This application claims the benefit of priority of Korean Patent Application No. 10-2017-0115226, filed on Sep. 8, 2017, entitled "APPARATUS FOR STABILIZING DC DISTRIBUTION SYSTEM", which is hereby incorporated by reference in its entirety into this application.

TECHNICAL FIELD

The present disclosure relates to a device for stabilizing a direct current (DC) distribution system, in which a voltage stabilization circuit is constructed using one pair of three pairs of switching elements in an inverter, and the voltage stabilization circuit is controlled to alleviate instability of a DC voltage generated in a transient period.

RELATED ART

A direct current (DC) distribution system is free of a reactance component, and, thus, suffers from no loss due to a reactive power. Further, the direct current (DC) distribution system is free of a frequency property and, thus, suffers from no skin effect. Therefore, the DC distribution system is advantageous in that a distribution efficiency thereof is higher than that of an AC distribution system.

In recent years, renewable energy generation is being commercialized, and high efficiency-based power conversion devices and DC loads, etc. are developed. For this reason, the direct current (DC) distribution system is in the spotlight.

The direct current (DC) distribution system may include a power supply stage, a distribution stage, and a load stage. A DC voltage power supply stage voltage from the power supply stage may be applied via the distribution stage to each load connected to the load stage.

However, when a large number of loads are connected to the direct current (DC) distribution system, the power supply stage voltage instability occurs due to interaction between a power conversion device included in the load and the system. In particular, when the load is connected to or removed from the direct current (DC) distribution system, the instability of the power supply stage voltage occurs at a transient period.

FIGS. 1 and 2 show waveforms of the power supply stage voltage occurring in the transient period immediately after the load is connected to or removed from the DC distribution system.

First, referring to FIG. 1, when the load is connected to the direct current (DC) distribution system, the power supply stage voltage $V_{BUS}$ may reduce instantaneously. The reduced power supply stage voltage $V_{BUS}$ oscillates for a predetermined time, and then returns to a normal state after the transient period.

Second, referring to FIG. 2, when the load is removed from the direct current (DC) distribution system, the power supply stage voltage $V_{BUS}$ may increase instantaneously. The increased power supply stage voltage $V_{BUS}$ oscillates for a predetermined time, and then returns to a normal state after the transient period.

The oscillation in the transient period produces a frequency component in the power supply stage voltage. The generated frequency component adversely affects the direct current (DC) distribution system. Accordingly, a device voltage stabilization device for stabilizing the power supply stage voltage in the transient period has been developed.

Conventional voltage stabilizers, however, are configured separately from loads connected to the direct current (DC) distribution system. Therefore, the conventional stabilization devices have a problem that the operation efficiency thereof may be low and the production cost thereof may not be reduced.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure aims to provide a device for stabilizing the direct current (DC) distribution system, in which the device is configured to stabilize a DC power supplied from the power supply stage of the DC power distribution system.

Further, the present disclosure aims to provide a device for stabilizing the direct current (DC) distribution system, in which a switching element non-activated for motor drive in an inverter is controlled to stabilize the DC power supplied from the power supply stage.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

To this end, in accordance with the present disclosure, there is provided a device for stabilizing a direct current (DC) distribution system, wherein the system includes a power supply stage, the device comprising: a capacitor unit charged by a DC voltage supplied from the power supply stage; an inverter unit including two pairs of driving switching elements and a pair of common switching elements, wherein the inverter unit is configured to use the two pairs of driving switching elements to convert the voltage charged in the capacitor unit into an AC power and to provide the AC power to a motor connected to the device; a voltage stabilization unit including the pair of common switching elements and at least one passive element, wherein the voltage stabilization unit is configured, based on a charging or discharging signal, to charge the capacitor unit with the DC voltage supplied from the power supply stage or to discharge the voltage charged in the capacitor unit to the power supply stage; and a control unit configured to compare the DC voltage supplied from the power supply stage with a reference range, and to provide the charging or discharging signal to the voltage stabilization unit based on the comparison result.

In one embodiment, the power supply stage is connected to a DC power supply for outputting the DC voltage or to a converter for converting an AC power supply to the DC voltage.

In one embodiment, the motor drives a reciprocating compressor.

In one embodiment, the control unit is configured to provide a driving signal to the inverter unit, wherein the driving signal is configured for controlling turn-on or turn-off of the two pairs of driving switching elements.

In one embodiment, the control unit is configured to receive a measured value of the DC voltage from a voltage sensor and to compare the received measured value with the reference range.

In one embodiment, when the DC voltage exceeds the reference range, the control unit is configured to provide a charging signal to the voltage stabilization unit, wherein when the DC voltage is smaller than the reference range, the control unit is configured to provide a discharging signal to the voltage stabilization unit.

In one embodiment, the common switching elements are turned on or off based on the charging or discharging signal.

In one embodiment, the voltage stabilization unit includes: a first inductor having one end connected to a node between the pair of common switching elements and the other end connected to a positive terminal of the power supply stage; and a first capacitor having one end connected to the positive terminal of the power supply stage and the other end connected to a negative terminal of the power supply stage.

In one embodiment, the voltage stabilization unit is configured to charge the capacitor unit with a current stored in the first inductor or to discharge the voltage charged in the capacitor unit to the power supply stage through the first inductor.

In one embodiment, the capacitor unit includes a first capacitor and a second capacitor, wherein the first and second capacitors are coupled in series to each other, wherein the capacitor unit is coupled in parallel with the power supply stage, wherein the voltage stabilization unit includes: a first inductor having one end connected to a node between the pair of common switching elements and the other end connected to a node between the first capacitor and second capacitor; and a second inductor having one end connected to the first inductor and the other end connected to the first capacitor.

In one embodiment, the voltage stabilization unit is configured to charge the first capacitor with a current stored in the first inductor or to discharge the voltage charged in the first capacitor to the power supply stage through the first inductor.

In one embodiment, said one pair of common switching elements are configured to perform zero voltage switching (ZVS) based on the charging or discharging signal.

According to the present disclosure, by stabilizing the DC power supplied from the power supply stage of the distribution system, the system efficiency degradation due to voltage instability as otherwise caused when the load is connected to or removed from the direct current (DC) distribution system may be suppressed.

Further, according to the present disclosure, by stabilizing the DC power supply using the switching element in the inverter, which is not used for motor drive, the device is easy to implement, and the production cost of the device is reduced.

DETAILED DESCRIPTION

Figure 1:
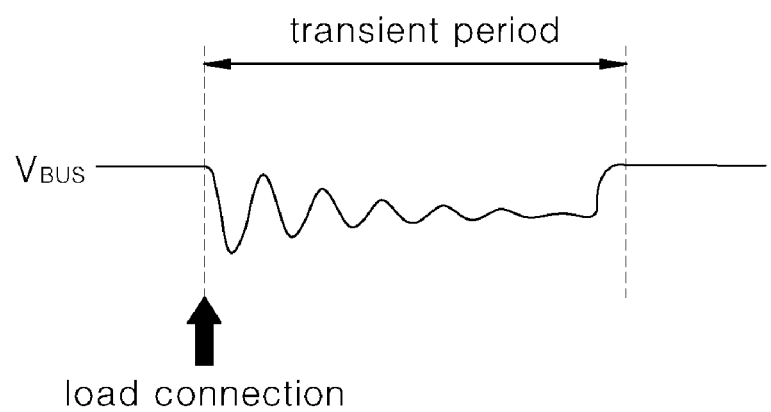
FIG. 1 and FIG. 2 show waveforms of the power supply stage voltage occurring in the transient period immediately after the load is connected to or removed from the DC distribution system.
Figure 2:
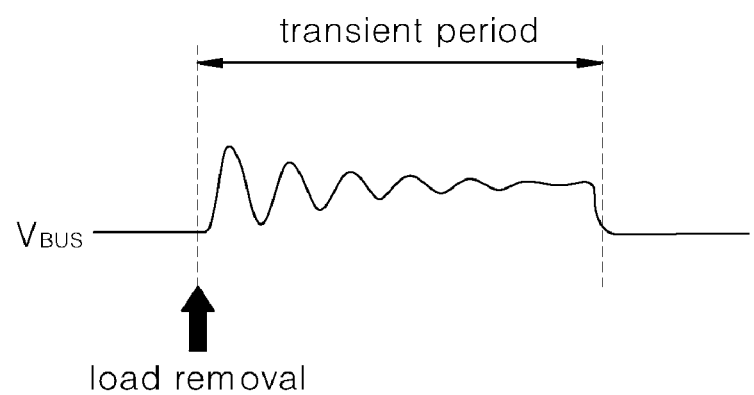

The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A device for stabilizing the direct current (DC) distribution system according to the present disclosure may be included in a load connected to a direct current (DC) distribution system. More specifically, the device for stabilizing the direct current (DC) distribution system may be included in the load using a three-wire inverter to drive the motor.

Hereinafter, the device for stabilizing the direct current (DC) distribution system according to an embodiment of the present disclosure and each component constituting the device will be described in detail with reference to FIG. 3 to FIG. 8.

Figure 3:
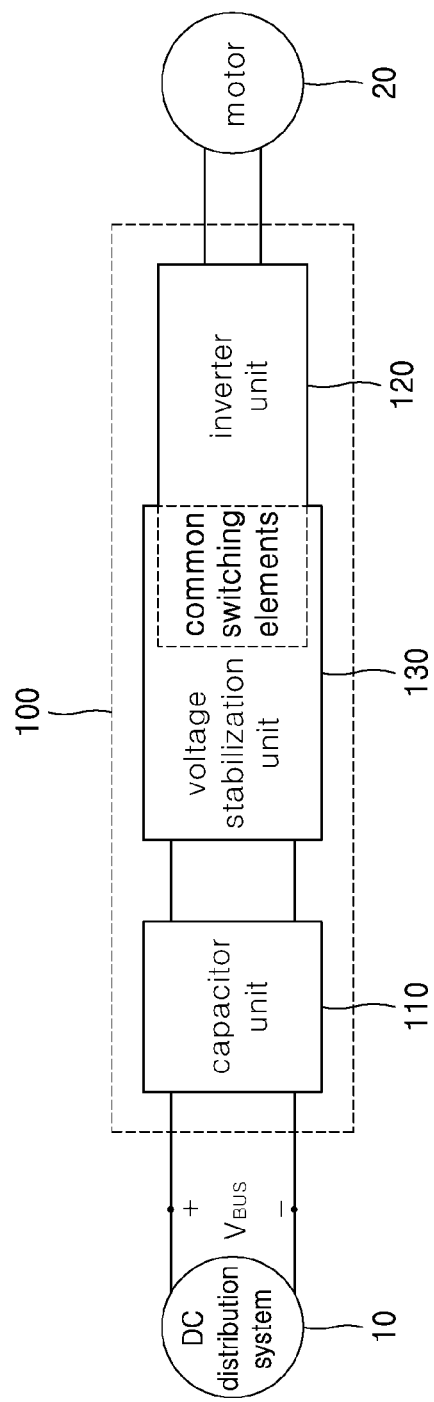
FIG. 3 shows that a device for stabilizing the direct current (DC) distribution system is connected to the DC distribution system and a motor, according to one embodiment of the present disclosure.
Figure 4:
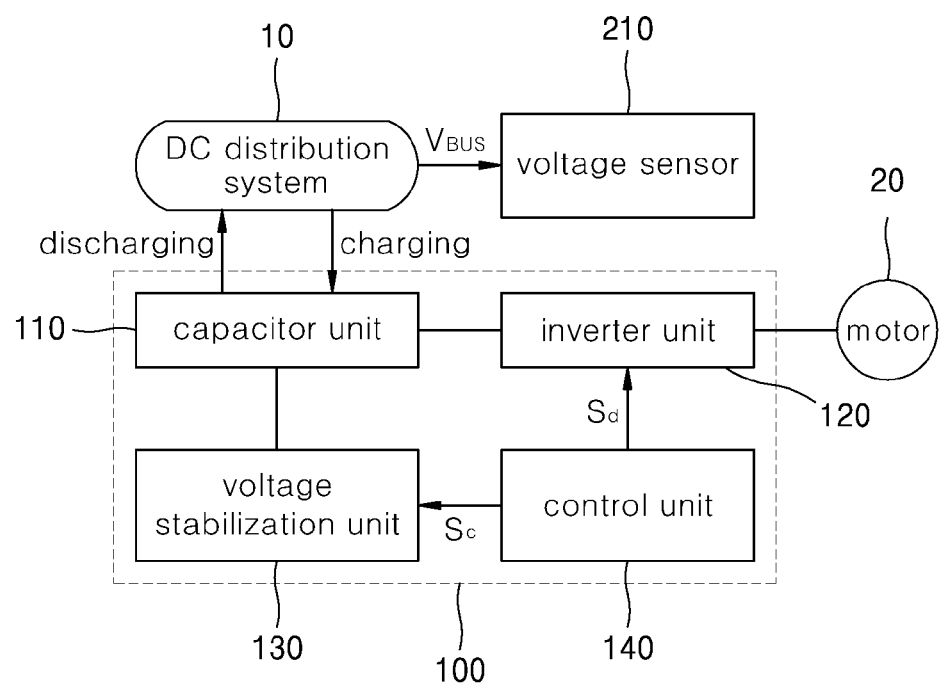
FIG. 4 shows a control flow chart of the device to stabilize the direct current (DC) distribution system shown in FIG. 3.

FIG. 3 shows that a device for stabilizing the direct current (DC) distribution system is connected to the DC distribution system and a motor, according to one embodiment of the present disclosure. FIG. 4 shows a control flow chart of the device to stabilize the direct current (DC) distribution system shown in FIG. 3.

Figure 5:
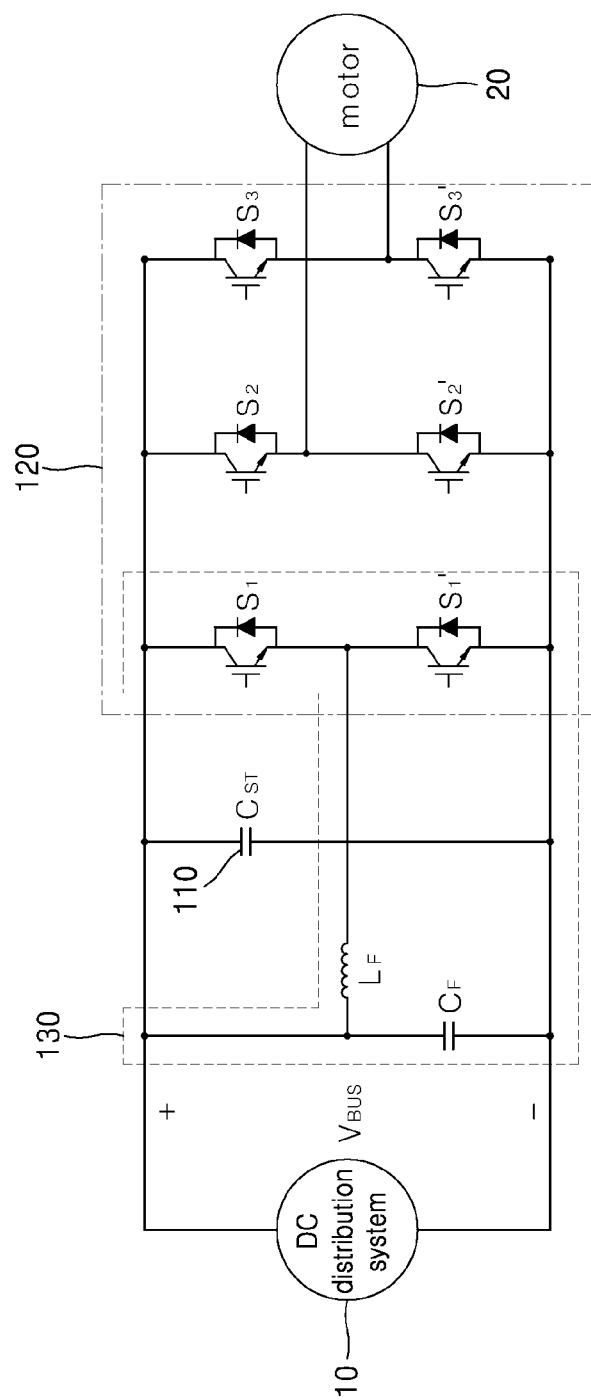
FIG. 5 is a circuit diagram of one example of the device to stabilize the direct current (DC) distribution system shown in FIG. 3.
Figure 6:
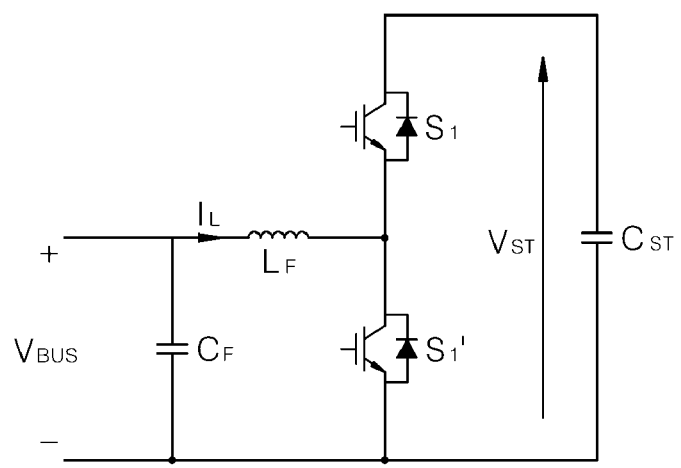
FIG. 6 is a circuit diagram showing a voltage stabilization unit and capacitor unit shown in FIG. 5.

FIG. 5 is a circuit diagram of one example of the device to stabilize the direct current (DC) distribution system shown in FIG. 3. FIG. 6 is a circuit diagram showing a voltage stabilization unit and capacitor unit shown in FIG. 5.

Figure 7:
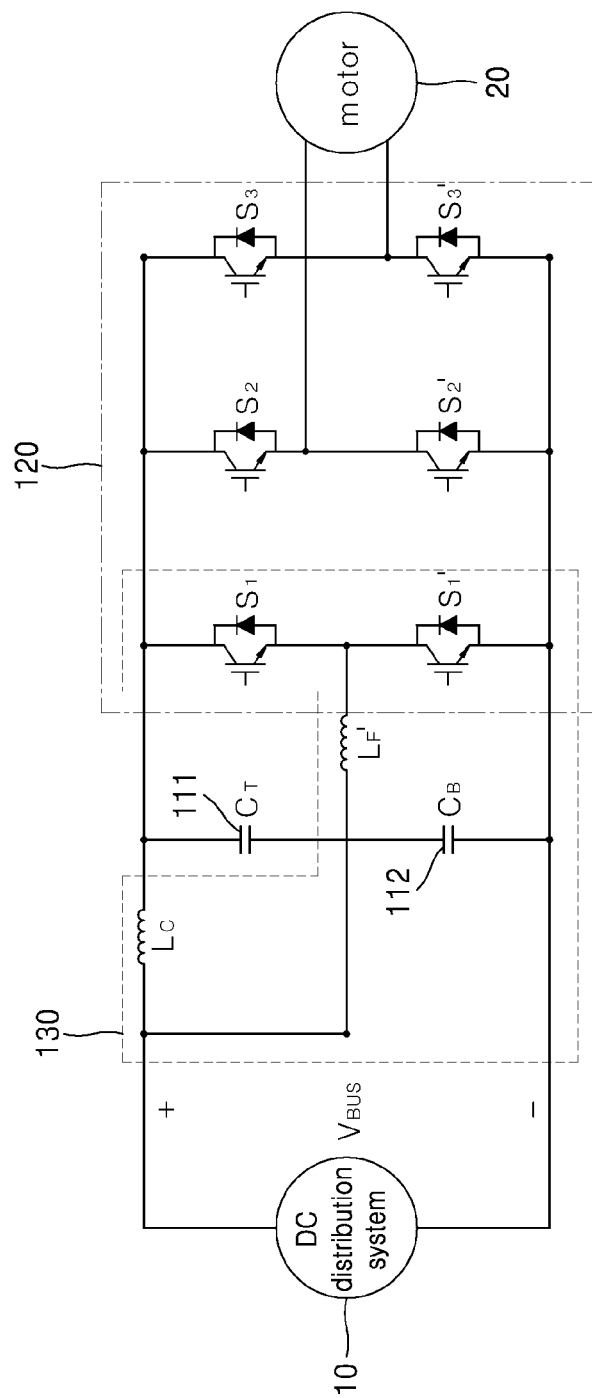
FIG. 7 is a circuit diagram showing another example of a device for stabilizing the direct current (DC) distribution system shown in FIG. 3.
Figure 8:
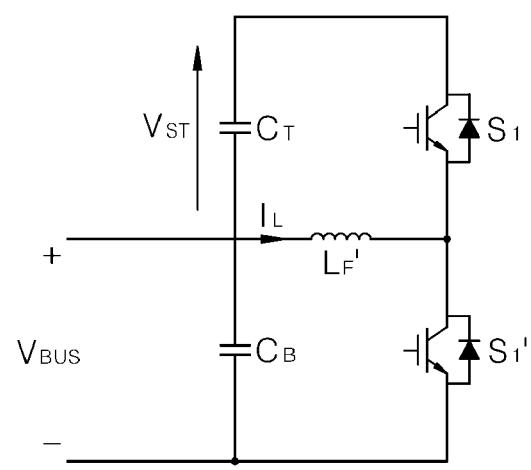
FIG. 8 is a circuit diagram showing a voltage stabilization unit and capacitor unit shown in FIG. 7.

FIG. 7 is a circuit diagram showing another example of a device for stabilizing the direct current (DC) distribution system shown in FIG. 3. FIG. 8 is a circuit diagram showing a voltage stabilization unit and capacitor unit shown in FIG. 7.

Referring to FIG. 3 and FIG. 4, the device 100 for stabilizing the direct current (DC) distribution system according to an embodiment of the present disclosure may include a capacitor unit 110, an inverter unit 120, a voltage stabilization unit 130, and a control unit 140. The device 100 for stabilizing the direct current (DC) distribution system shown in FIG. 3 and FIG. 4 is merely one embodiment. The components of the device are not limited to those of the embodiment shown in FIG. 3 and FIG. 4. As required, some of the components may be added, changed or deleted.

Referring to FIG. 3 and FIG. 5, the capacitor unit 110 may be charged by a DC voltage $V_{BUS}$ supplied from the power supply stage of the DC distribution system.

In this connection, the power supply stage may be included in the DC distribution system 10 that supplies the DC voltage $V_{BUS}$ to the device 100. The DC power distribution system 10 may be connected to a DC power source or an AC power source to supply the DC voltage $V_{BUS}$ to the device 100 for stabilizing the direct current (DC) distribution system.

For example, the DC power distribution system 10 may be connected to a DC power source that outputs a DC voltage $V_{BUS}$ thereto. Alternatively, the DC power distribution system 10 may be coupled to an output of a converter that converts an alternating current power to the DC voltage $V_{BUS}$.

In other words, the power supply stage may be connected to a DC power source that outputs the DC voltage $V_{BUS}$. Alternatively, the power supply stage may be coupled to the output of the converter, which converts the AC power to a DC voltage $V_{BUS}$.

The capacitor unit 110 may act as a DC-link capacitor unit configured to store a DC voltage $V_{BUS}$ supplied from the power supply stage and to supply the DC voltage to the inverter unit 120, which will be described later.

When the power supply stage is connected to the output terminal of the converter for converting AC power into DC voltage $V_{BUS}$, the capacitor unit 110 may act as a DC-link capacitor unit configured to smooth the DC voltage $V_{BUS}$ output from the converter and provide the smoothed voltage to the inverter unit 120 to be described later.

The inverter unit 120 may be implemented as a three-wire inverter. In this case, the inverter unit may include three pairs of switching elements S1 to S3 and S1' to S3'.

The three pairs of switching elements S1 to S3 and S1' to S3' may be composed of two pairs of driving switching elements S2 and S2', S3 and S3' and a pair of common switching elements S1 and S1'.

The inverter unit 120 converts the voltage charged in the capacitor unit 110 into AC power using the two pairs of driving switching elements S2 and S2', S3 and S3'. Then, the converted voltage may be supplied to the motor 20.

In this connection, the driving switching elements may not be specific switching elements, but may be any two pairs of the three pairs of switching elements S1 to S3 and S1' to S3'. Accordingly, the common switching elements may be one pair of switching elements other than the driving switching elements among the three pairs of the switching elements S1 to S3 and S1' to S3'.

The inverter unit 120 may convert the voltage charged in the capacitor unit 110 into two pairs of driving currents having arbitrary phase differences using the two pairs of driving switching elements S2 and S2', and S3 and S3'.

The motor 20 receives the driving current output from the inverter unit 120 and is driven using the current.

The motor 20 connected to the inverter unit 120 may be implemented as a motor for driving a reciprocating compressor. The reciprocating compressor may be implemented, for example, as a linear compressor.

The voltage stabilization unit 130 includes the pair of common switching elements S1 and S1', and at least one passive element. Based on a charging or discharging signal $S_C$, the voltage stabilization unit 130 may charge the capacitor unit 110 with the DC voltage $V_{BUS}$ supplied from the power supply stage or discharge the charged voltage into the capacitor unit 110 to the power supply stage. In this connection, the passive element may include an inductor and a capacitor to be described later.

As shown in FIG. 3 and FIG. 5, the inverter unit 120 and the voltage stabilization unit 130 as described above may share the common switching elements S1 and S1'. In other words, the common switching elements S1 and S1' included in the inverter unit 120 may be included in the voltage stabilization unit 130.

Referring to FIG. 4, the control unit 140 compares the DC voltage $V_{BUS}$ supplied from the power supply stage with a reference range, and, then, based on the comparison result, supplies the charging or discharging signal $S_c$ to the voltage stabilization unit 130.

In this connection, the charging or discharging signal $S_c$ may be a pulse signal for controlling switching operation of each common switching element S1 and S1'. The charging or discharging signal may include at least one of a charging signal and a discharging signal.

The control unit 140 may be implemented as a microcomputer for generating a pulse signal constituting the charging or discharging signal $S_c$. Accordingly, the voltage stabilization unit 130 may include a gate driver. The gate driver controls the common switching elements S1 and S1' in response to the pulse signal.

The control unit 140 receives a measured value of the DC voltage $V_{BUS}$ from the voltage sensor 210. The control unit may then compare the measured value of the direct current voltage $V_{BUS}$ with a reference value.

The voltage sensor 210 is provided in the power supply stage. The sensor may measure the DC voltage $V_{BUS}$ output from the DC distribution system 10 and provide the measured value to the control unit 140. For this purpose, the voltage sensor 210 may be embodied as a digital sensor capable of data communication.

Meanwhile, in FIG. 4, the device according to the present disclosure is shown as not including the voltage sensor 210. However, the device according to the present disclosure may include the voltage sensor 210 as described above.

The control unit 140 compares the DC voltage $V_{BUS}$ of the power supply stage with the reference value or range and generates either a charging signal or a discharging signal based on the comparison result.

In this connection, the reference range may be a range of a voltage acceptable in the transient period or, alternatively, may be determined according to the user's settings.

For example, when the DC voltage $V_{BUS}$ output from the DC distribution system 10 is preset to 10 [V], the reference range may be set within a range of +/−10% of the preset voltage. That is, the reference range may be set to 9 [V] to 11 [V].

When the measured DC voltage $V_{BUS}$ exceeds the reference range (e.g., the voltage exceeds 11 [V]), the control unit 140 may generate a charging signal and provide the generated charging signal to the voltage stabilization unit 130. On the other hand, when the measured DC voltage $V_{BUS}$ is less than the reference range (e.g., the voltage is less than 9 [V]), the control unit 140 generates a discharge signal and supplies the generated discharge signal to the voltage stabilization unit 130.

The voltage stabilization unit 130 may charge the capacitor unit 110 with the DC voltage $V_{BUS}$ as supplied from the power supply stage based on the charge signal output from the control unit 140. Alternatively, the voltage stabilization unit 130 may discharge the voltage charged in the capacitor unit 110 to the power supply stage, based on the discharge signal output from the control unit 140.

More specifically, the common switching elements S1 and S1' included in the voltage stabilization unit 130 may perform turn-on or turn-off based on the charging or discharging signal $S_c$ provided from the control unit 140.

According to the switching operation of the common switching elements S1 and S1', the DC voltage VBUS supplied from the power supply stage may be stored in the capacitor unit 110. Further, according to the switching operation of the common switching elements S1 and S1', the charged voltage in the capacitor unit 110 may be discharged to the power supply stage.

Referring to FIG. 5, the voltage stabilization unit 130 may include a first inductor $L_F$ and first capacitor $C_F$. The first inductor $L_F$ has one end connected to a node between the pair of common switching elements S1 and S1', and the other end connected to a positive terminal + of the power supply stage. The first capacitor $C_F$ has one end connected to the positive terminal + of the power supply stage and the other end connected to a negative terminal − of the power supply stage.

The first capacitor $C_F$ acts as a filter capacitor, which may mitigate the ripple caused by the switching action of the common switching elements S1 and S1'. Further, when each common switching element S1 and S1' performs turn-on or turn-off with a short dead time, the first inductor $L_F$ may limit the current flow between the power supply stage and the capacitor unit 110 $C_{ST}$.

The common switching elements S1 and S1' perform the switching operation based on the charging or discharging signal $S_c$. Then, the capacitor unit $C_{ST}$ may be charged or discharged through the current path formed according to the switching operation.

The voltage stabilization unit 130 may charge the capacitor unit $C_{ST}$ with the current stored in the first inductor $L_F$ or discharge the voltage charged in the capacitor unit $C_{ST}$ to the power supply stage through the first inductor $L_F$.

Referring to FIG. 6 showing only the voltage stabilization unit 130 and the capacitor unit 110 as shown in FIG. 5, the process of charging or discharging the capacitor unit $C_{ST}$ according to the switching operation of the common switching elements S1 and S1' will be described in detail.

More specifically, referring to FIG. 6, the voltage stabilization unit 130, in response to the charging signal, turns on the second common switching element S1' and turns off the first common switching element S1 for a predetermined time. Thus, the current $I_L$ output from the power supply stage may be stored in the first inductor $L_F$.

After a predetermined time has elapsed, the voltage stabilization unit 130 may turn off the common switching elements S1 and S1'. Thus, the current $I_L$ stored in the first inductor $L_F$ is provided to the capacitor unit $C_{ST}$ through the diode of the first common switching element S1. Thus, the capacitor unit $C_{ST}$ may be charged with the corresponding current $I_L$.

On the other hand, upon responding to the discharge signal, the voltage stabilization unit 130 turns on the first common switching element S1 and turns off the second common switching element S1' for a predetermined time. Thus, the voltage charged in the capacitor unit $C_{ST}$ may be provided to the power supply stage via the first inductor $L_F$.

Hereinafter, another example of the voltage stabilization unit 130 will be described in detail with reference to FIG. 7.

Referring to FIG. 7, unlike FIG. 5, the capacitor unit 110 may include a first capacitor 111 $C_T$, and a second capacitor 112 $C_B$.

The voltage stabilization unit 130 may include a second inductor $L_F'$ and a third inductor $L_C$. The second inductor $L_F'$ has one end connected to a node between the pair of common switching elements S1 and S1', and the other end connected to a node between the first capacitor $C_T$ and the second capacitor $C_B$. The third inductor $L_C$ has one end connected to the second inductor $L_F'$ and the other end connected to the first capacitor $C_T$.

In this connection, the node connected to the second inductor $L_F'$ and the third inductor $L_C$ may be connected to the positive terminal + of the power supply stage.

The second capacitor $C_B$ acts as a filter capacitor, and mitigates a ripple caused by the switching operation of the common switching elements S1 and S1'. Further, when the common switching elements S1 and S1' perform a turn-on or turn-off operation with a short dead time, the second inductor $L_F'$ may limit the current flow between the power supply stage and the first capacitor $C_T$.

Further, the third inductor LC may prevent a short current which is otherwise generated in the first capacitor CT when the node between the first capacitor $C_T$ and the second capacitor $C_B$ and the positive terminal of the power supply stage are connected to each other.

The voltage stabilization unit 130 may charge the first capacitor $C_T$ with a current stored in the second inductor $L_F'$ or discharge the voltage charged in the first capacitor $C_T$ through the second inductor $L_F'$ to the power supply stage.

FIGS. 9 to 12 are circuit diagrams showing an operation of the circuit shown in FIG. 8. FIG. 13 is a graph showing inductor current and capacitor voltage according to the procedure of FIG. 9 to FIG. 12.

Hereinafter, referring to FIG. 8 and FIG. 9 to FIG. 13 showing only the voltage stabilization unit 130 and the capacitor unit 110 as shown in FIG. 7, the process of charging or discharging the first capacitor $C_T$ according to the switching operation of the common switching element S1 and S1' will be described in detail.

The circuit as shown in FIG. 8 may be configured as circuits (mode 1 to mode 4) shown in FIG. 9 to FIG. 12 sequentially, based on the switching operation of the pair of common switching elements S1 and S1'. In this regard, a pulse signal applied to each of the common switching elements S1 and S1', a current $I_L$ flowing in the second inductor $L_F'$, and the voltage $V_{ST}$ stored in the first capacitor $C_T$ over time may be graphically shown in FIG. 13

Figure 9:
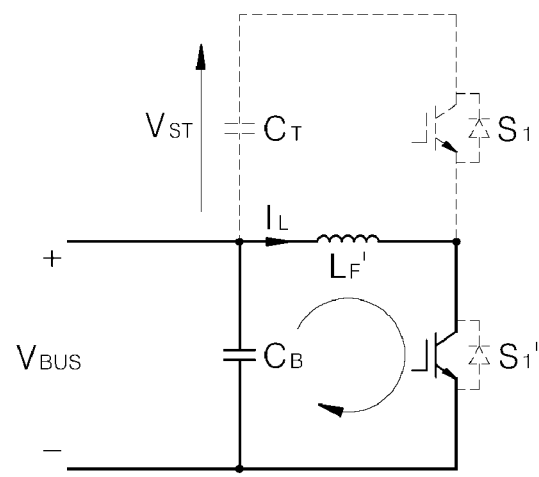
FIGS. 9 to 12 are circuit diagrams showing an operation of the circuit shown in FIG. 8.

More specifically, referring to FIG. 9, the voltage stabilization unit 130, in response to the charging signal, turns on the second common switching element S1' and turns off the first common switching element S1 for a predetermined time. Thus, the current $I_L$ output from the power supply stage may be stored in the second inductor $L_F'$.

Figure 10:
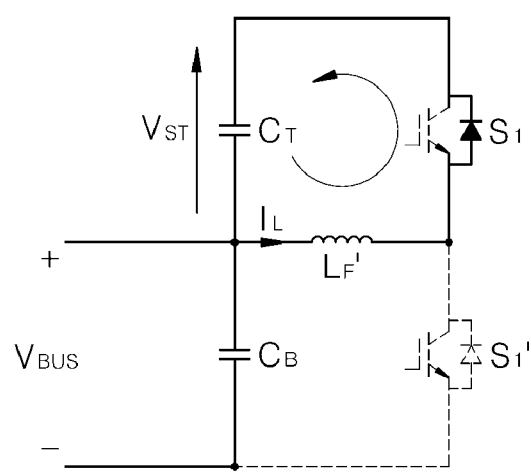

Referring to FIG. 10, after a predetermined time has elapsed, the voltage stabilization unit 130 may turn off the common switching elements S1 and S1' for a dead time $t_d$. Thus, the current IL stored in the second inductor $L_F'$ may be provided to the first capacitor $C_T$ through a diode of the first common switching element S1 in the conducting state. Thus, the first capacitor $C_T$ may be charged by the current.

By forming the path of the current through the diode for the dead time $t_d$, the first common switching element S1, which is subsequently turned on, may perform zero voltage switching (ZVS).

More specifically, the current flowing through the diode may gradually decrease. Thus, before the direction of the current is switched to the positive direction of the first common switching element S1 (the reverse direction of the diode), the voltage applied across the first common switching element S1 may be zero.

When the voltage across the first common switching element S1 is zero, the first common switching element S1 is turned on. Thus, the first common switching element S1 may perform the zero voltage switching operation, thereby reducing the switching loss.

Figure 11:
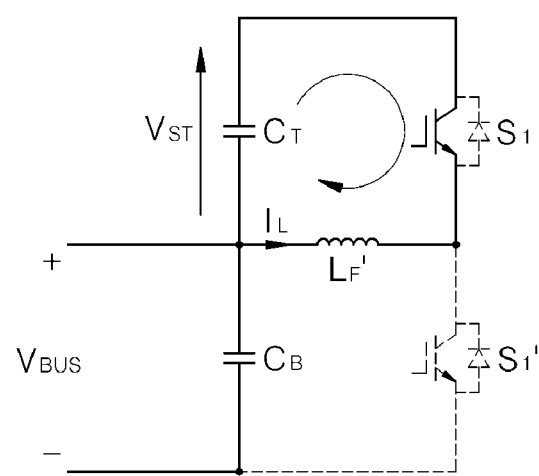

Referring to FIG. 11, in response to the discharge signal, the voltage stabilization unit 130 may turn on the first common switching element S1 and turn off the second common switching element S1' for a preset time. Thus, the voltage charged in the first capacitor $C_T$ may be provided to the power supply stage through the second inductor $L_F'$.

Figure 12:
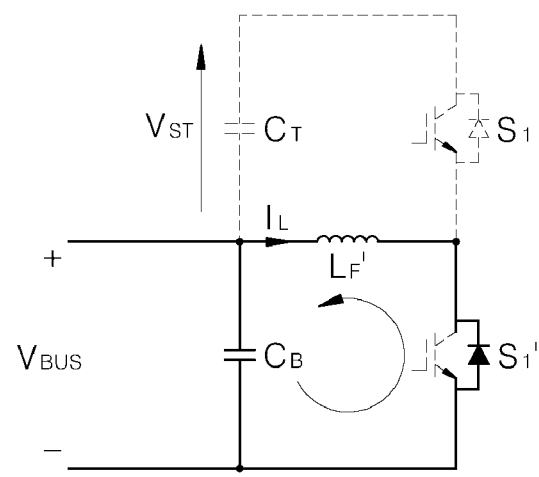
Figure 13:
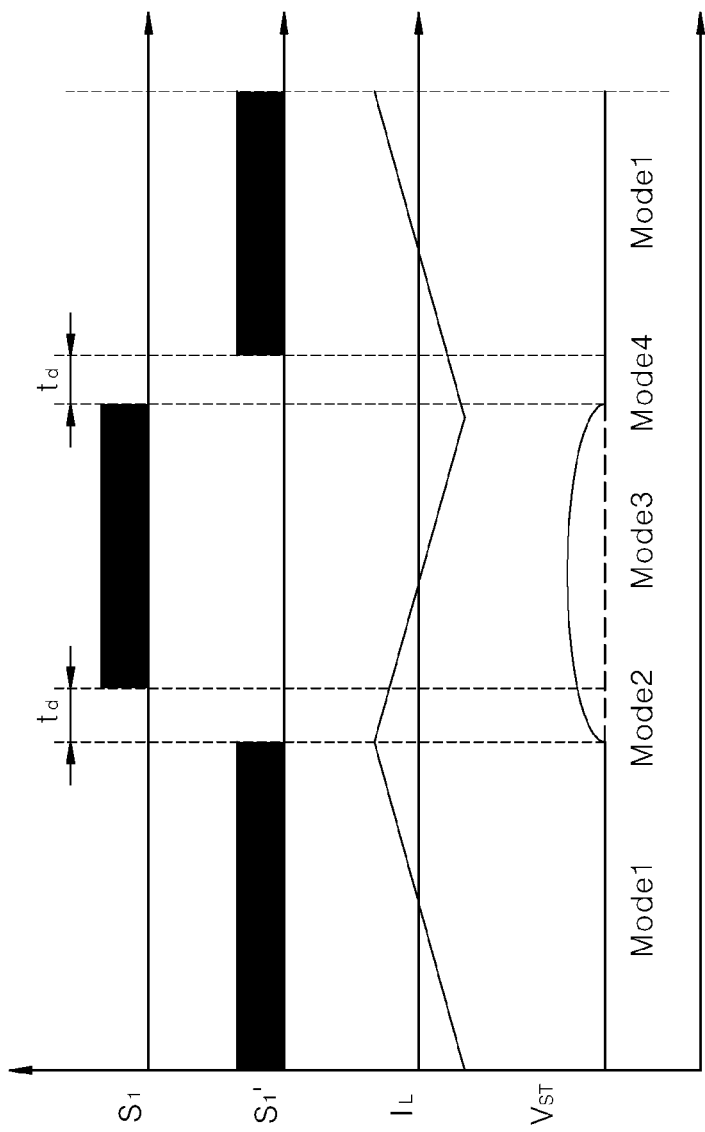
FIG. 13 is a graph showing inductor current and capacitor voltage according to the procedure of FIG. 9 to FIG. 12.

Next, referring to FIG. 12, after a predetermined time has elapsed, the voltage stabilization unit 130 may turn off both the common switching elements S1 and S1' for the dead time $t_d$. Thus, the diode of the second common switching element S1' is electrically conductive. Thus, the current flowing to the power supply stage through the second inductor $L_F'$ may be reduced. In other words, the magnitude of the current $I_L$ flowing in the direction as shown in the figure may increase.

By forming the path of current through the diode for the dead time $t_d$, the second common switching element S1', which is subsequently turned on, may perform a zero voltage switching operation.

More specifically, the current flowing through the diode may gradually decrease. Thus, before the direction of the current is switched to the positive direction of the second common switching element S1' (the reverse direction of the diode), the voltage applied across the second common switching element S1' may be zero.

When the voltage across the second common switching element S1' is zero, the second common switching element S1' is turned on. Thus, the second common switching element S1' may perform the zero voltage switching operation, thereby reducing the switching loss.

As described above, according to the present disclosure, by stabilizing the DC power supplied from the power supply stage of the distribution system, the system efficiency degradation due to voltage instability as otherwise caused when the load is connected to or removed from the direct current (DC) distribution system may be suppressed.

Further, according to the present disclosure, by stabilizing the DC power supply using the switching element in the inverter, which is not used for motor drive, the device is easy to implement, and the production cost of the device is reduced.

Figure 14:
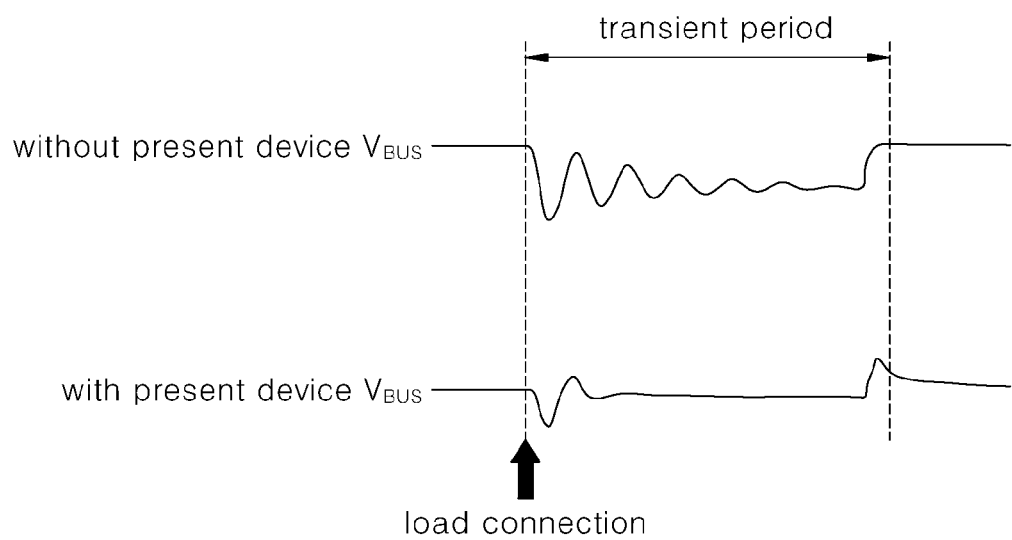
FIG. 14 and FIG. 15 show improved waveforms of the power supply stage voltage in the transient period according to the application of the present disclosure.
Figure 15:
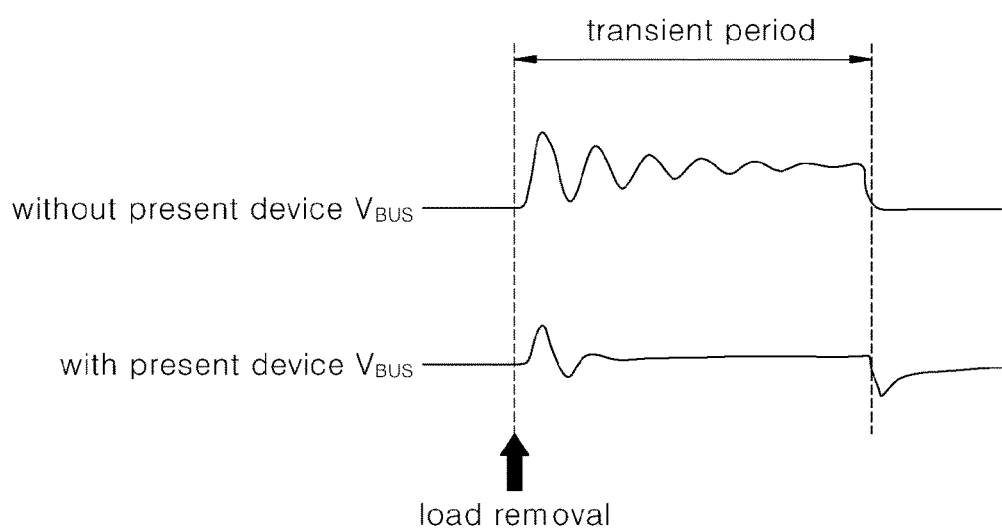

FIG. 14 and FIG. 15 show improved waveforms of the power supply stage voltage in the transient period according to the application of the present disclosure.

Referring to FIG. 14, after the load is connected to the DC distribution system, the voltage instability (voltage drop and oscillation) occurring in the transient period may be mitigated by the discharge operation of the voltage stabilization unit 130. In other words, upon the voltage drop due to the load connection, the voltage stabilization unit 130 may compensate for the voltage drop in the power supply stage by discharging the voltage stored in the capacitor unit 110.

Referring to FIG. 15, after the load is removed from the DC distribution system, the voltage instability (voltage rise and oscillation) occurring in the transient period may be alleviated by the charging operation of the voltage stabilization unit 130. In other words, when the voltage increases due to the load removal, the voltage stabilization unit 130 may charge the capacitor unit 110 using the increased voltage to compensate for the voltage rise of the power supply stage.

This reduces the peak and oscillation of the power supply stage voltage ($V_{Bus}$). Further, the maximum voltage generated in the power supply stage may be limited. Thus, it is possible to use a component having a lower rated voltage.

Referring again to FIG. 4, the control unit 140 may provide a driving signal $S_d$ to the inverter unit 120 to control the turn-on or turn-off operation of the two pairs of driving switching elements. In this connection, the driving signal may be a pulse width modulation (PWM) signal.

Accordingly, the inverter unit 120 may include a gate driver that provides a driving voltage to the driving switching elements S2 and S2', S3 and S3' in response to the pulse width modulation signal.

In other words, the control unit 140 may control all of the driving switching elements and common switching element as described above. The driving switching elements may be controlled in a closed loop manner based on the speed of the motor 20 and the driving current of the inverter.

The control of the switching element in the inverter unit 120 for driving the motor 20 is performed according to a general method used in the related art. Therefore, a detailed description thereof will be omitted.

While the foregoing is directed to the embodiments of the present disclosure, various changes and modifications may be made by those skilled in the art. Accordingly, it is to be understood that such changes and modifications are included within the scope of the present disclosure unless they depart from the scope of the present disclosure.

What is claimed is:

1. A device for stabilizing a direct current (DC) distribution system, wherein the system includes a power supply stage, the device comprising:
   a capacitor unit charged by a DC voltage supplied from the power supply stage;
   an inverter unit including two pairs of driving switching elements and a pair of common switching elements, wherein the inverter unit is configured to use the two pairs of driving switching elements to convert the voltage charged in the capacitor unit into an AC power and to provide the AC power to a motor connected to the device;
   a voltage stabilization unit including the pair of common switching elements and at least one passive element, wherein the voltage stabilization unit is configured, based on a charging or discharging signal, to charge the capacitor unit with the DC voltage supplied from the power supply stage or to discharge the voltage charged in the capacitor unit to the power supply stage; and
   a control unit configured to compare the DC voltage supplied from the power supply stage with a reference range, and to provide the charging or discharging signal to the voltage stabilization unit based on the comparison result.

2. The device of claim 1, wherein the power supply stage is connected to a DC power supply for outputting the DC voltage or to a converter for converting an AC power supply to the DC voltage.

3. The device of claim 1, wherein the motor drives a reciprocating compressor.

4. The device of claim 1, wherein the control unit is configured to provide a driving signal to the inverter unit, wherein the driving signal is configured for controlling turn-on or turn-off of the two pairs of driving switching elements.

5. The device of claim 1 further comprising a voltage sensor provided in the power supply stage, wherein the voltage sensor measures the DC voltage supplied from the power supply stage.

6. The device of claim 5, wherein the control unit is configured to receive a measured value of the DC voltage from the voltage sensor and to compare the received measured value with the reference range.

7. The device of claim 1, wherein when the DC voltage exceeds the reference range, the control unit is configured to provide a charging signal to the voltage stabilization unit, wherein when the DC voltage is smaller than the reference range, the control unit is configured to provide a discharging signal to the voltage stabilization unit.

8. The device of claim 1, wherein the common switching elements are turned on or off based on the charging or discharging signal.

9. The device of claim 1, wherein the passive element includes a first inductor having one end connected to a node between the pair of common switching element, and further includes a second inductor or a capacitor connected to the other end of the first inductor.

10. The device of claim 1, wherein the pair of common switching elements includes a first common switching element and a second common switching element, wherein the voltage stabilization unit includes:
    a first inductor having one end connected to a node between the first common switching element and the second common switching element, and the other end connected to a positive terminal of the power supply stage; and
    a first capacitor having one end connected to the positive terminal of the power supply stage and the other end connected to a negative terminal of the power supply stage.

11. The device of claim 10, wherein the voltage stabilization unit is configured to charge the capacitor unit with a current stored in the first inductor or to discharge the voltage charged in the capacitor unit to the power supply stage through the first inductor.

12. The device of claim 10, wherein the voltage stabilization unit is configured to, in response to a charging signal, turn on the second common switching element and turn off the first common switching element for a predetermined time, so that a current output from the power supply stage is stored in the first inductor.

13. The device of claim 12, wherein, after the predetermined time has elapsed, the voltage stabilization unit is configured to turn off the common switching elements, so that the capacitor unit is charged with the current stored in the first inductor.

14. The device of claim 10, wherein the voltage stabilization unit is configured to, in response to a discharge signal, turn on the first common element and turn off the second common switching element for a predetermined time, so that the voltage charged in the capacitor unit is discharged to the power supply stage via the first inductor.

15. The device of claim 1, wherein the capacitor unit includes a first capacitor and a second capacitor, wherein the pair of common switching elements includes a first common switching element and a second common switching element, wherein the first and second capacitors are coupled in series to each other, wherein the capacitor unit is coupled in parallel with the power supply stage, and
    wherein the voltage stabilization unit includes:
    a second inductor having one end connected to a node between the pair of common switching elements and the other end connected to a node between the first capacitor and second capacitor; and
    a third inductor having one end connected to the second inductor and the other end connected to the first capacitor.

16. The device of claim 15, wherein the voltage stabilization unit is configured to charge the first capacitor with a current stored in the second inductor or to discharge the voltage charged in the first capacitor to the power supply stage through the second inductor.

17. The device of claim 15, wherein the voltage stabilization unit is configured to, in response to a charging signal, turn on the second common switching element and turn off the first common switching element for a predetermined time, so that a current output from the power supply stage is stored in the second inductor.

18. The device of claim 17, wherein, after the predetermined time has elapsed, the voltage stabilization unit is configured to turn off the common switching elements, so that the first capacitor is charged by the current stored in the second inductor.

19. The device of claim 15, wherein the voltage stabilization unit is configured to, in response to a discharge signal, turn on the first common element and turn off the second common switching element for a preset time, so that the voltage charged in the first capacitor is discharged to the power supply stage through the second inductor.

20. The device of claim 1, wherein said one pair of common switching elements are configured to perform zero voltage switching (ZVS) based on the charging or discharging signal.

* * * * *